United States Patent [19]

Hoffman et al.

[11] Patent Number: 4,691,865

[45] Date of Patent: Sep. 8, 1987

[54] DEVICE FOR CHILLING STREAM OF GAS-SUSPENDED PARTICLES

[75] Inventors: Reinhold Hoffman, Sprockhovel; Walter Klimke, Dusseldorf, both of Fed. Rep. of Germany

[73] Assignee: Interlock Corporation, Cleveland, Ohio

[21] Appl. No.: 821,801

[22] Filed: Jan. 23, 1986

[51] Int. Cl.[4] .......................... B05B 1/34; B05B 5/02

[52] U.S. Cl. .................................. 239/690; 239/132; 239/430; 264/12; 266/241; 425/7

[58] Field of Search ................. 425/7; 264/12; 239/8, 239/128, 132–132.5, 690, 13, 429, 430, 433; 266/217, 241

[56] References Cited

U.S. PATENT DOCUMENTS

| | | | |
|---|---|---|---|
| 2,624,624 | 1/1953 | Kirschbaum | 239/132.5 |
| 3,436,792 | 4/1969 | Hench | 425/7 X |
| 3,612,405 | 10/1971 | Heinrich | 239/433 X |
| 4,533,376 | 8/1985 | Muschelknautz | 264/12 X |

FOREIGN PATENT DOCUMENTS

| | | | |
|---|---|---|---|
| 567506 | 8/1977 | U.S.S.R. | 239/132.5 |

*Primary Examiner*—Andres Kashnikow
*Attorney, Agent, or Firm*—Walter J. Monacelli

[57] ABSTRACT

The process described herein comprises the mixing of a chilled gas into a stream of gas-suspended particles. Preferably the chilled gas is the same as the gas in which the particles are suspended and the particles are electrostatically charged. A novel device is described which provides a chamber extending lengthwise of the device into which channels feed the chilled gas into the particle suspension. The chilled gas is introduced from an external cooling system with the gas being advantageously cooled during passage through a coil whose outer walls are cooled by liquid nitrogen or dry ice. This process and device are of particular utility in a system for the spraying of electrostatically charged particles.

12 Claims, 5 Drawing Figures

U.S. Patent  Sep. 8, 1987  4,691,865
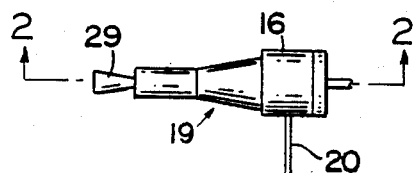
FIG. 1
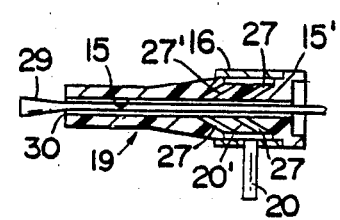
FIG. 2
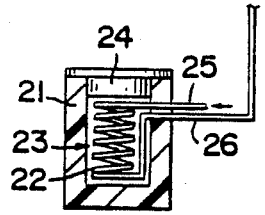
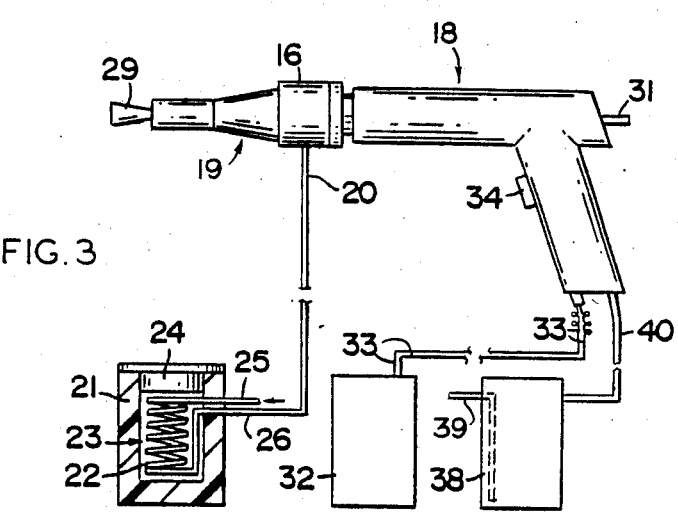
FIG. 3
FIG. 4
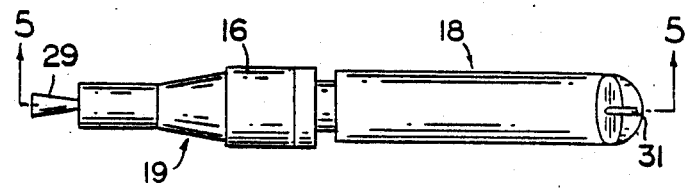
FIG. 5

DEVICE FOR CHILLING STREAM OF GAS-SUSPENDED PARTICLES

BACKGROUND OF THE INVENTION

1. Field of the Invention

This invention relates to a process and apparatus for the chilling of a stream of gas-suspended particles. More specifically it relates to the introduction of a supercooled gas into a stream of gas-suspended particles. Still more specifically it relates to a process and a device particularly suitable for chilling a gas suspension of electrostatically charged particles.

2. Description of the Prior Art

U.S. Pat. No. 3,279,936, issued to Clarence W. Forestek on Oct. 18, 1966, is directed to the treating of metal surfaces having crevices or pores therein with perfluorocarbon polymer particles so as to deposit such particles into the pores. By having the metal at a raised temperature to enlarge the pores and the particles chilled to contract them, the particles are interlocked in the pores when the particles and the metal come to an equilibrium temperature whereby the particles are expanded and the pores contracted.

U.S. Pat. No. 4,051,275, issued on Sept. 27, 1977 was also granted to Clarence W. Forestek and is directed to applying such chilled particles in a fluid stream carrying finely divided particles applied at a pressure of 30–120 psi to compact previously deposited particles and thereafter depositing additional particles in the space freed by the compaction, said additional particles being a temperature at least 100° F. below the temperature of the metal surface so that these additional particles will also be locked into the fissures upon reaching equilibrium temperature.

OBJECTIVES OF THE INVENTION

It is an objective of this invention to aid in the deposition of such chilled finely divided particles into crevices and pores in the surface of metal objects, particularly large objects, by placing an electrostatic charge on these particles.

It is also an objective of this invention to produce a chilling effect on the electrostatically charged particles prior to application of the same on the said metal surface.

It is also an objective of this invention to effect a chilling effect on a gas suspension of electrostatically charged particles by the injection of a supercooled gas in the said suspension prior to application of the particles onto the said metal surface.

It is also an objective of this invention to design an effective device for feeding supercooled gas into the said gas suspension of electrostatically charged particles.

SUMMARY OF THE INVENTION

In accordance with the present invention it has been found that finely divided particles of perfluorocarbon polymer or graphite, molybdenum sulfate, boron nitride or other suitable particles may be electrostatically charged and then chilled to an appropriately low temperature by the introduction of a supercooled gas into the suspension of particles. Preferably the supercooled gas is the same type of gas as that used as the suspension medium but this is not critical and other suitable gases may be used. A device for effecting the introduction of the supercooled gas in the particle suspension is also a part of this invention and is described in detail hereinafter.

A companion application filed simultaneously herewith, Ser. No. 821,802, describes and claims the process and apparatus for spraying chilled electrostatically charged particles onto rotating large metal objects to effect the deposition and compacting of particles in heat enlarged surface pores of the said object and thereby cause interlocking of the particles in the pores as described in the above-cited U.S. Patents.

The electrostatic charge applied to the particles is advantageously in the range of 50–150 kilovolts, preferably about 100 kv. Preferably, the particles are given a positive charge and the object is given a minus potential. However, while this system is preferred, the reverse system of charging a particularly advantageous device is that described herein. This device comprises a spray gun, such as used for electrostatically spraying paint which has an interior channel through which is passed the spraying medium, in this case the suspension of particles disposed in dry air or inert gas, such as nitrogen, carbon dioxide, etc. This suspension of particles is passed between electrodes which generate an appropriate electrical field to produce the desired electrostatic charges on the particles. Appropriate electrical charge for the electrodes is maintained by a high voltage transformer and condensers.

The electrostatically charged particle suspension is passed into the chilling apparatus in which a supercooled gas is introduced into the suspension. A cooling medium such as liquid nitrogen or solid carbon dioxide is maintained in an adjacent vessel so that supercooling can be effected on the gas which is to be introduced into the gaseous suspension medium. The supercooled gas, preferably the same as used in the original suspension, is introduced into the suspension of electrostatically charged particles during its passage through a chamber or passageway in the chilling apparatus. The supercooled gas introduced into the suspension is desirably maintained at −20° C. (−4° F.) to −130° C. (−202° F.), preferably −50° C. (−58° F.) to −120° C. (−184° F.).

The spray gun used for applying the electrostatic charge to the particles may be any one of a number of commercial spray guns suitable for spraying electrostatically charged particles. A particularly suitable spray gun is the one marketed under the trademark "GEMA" which has a four electrode and high voltage generating system including a high voltage transformer and a high voltage set of condensers. The cooling attachment is fitted onto the front or spraying end of the spray gun so that as the spray of suspended electrostatically charged particles emanates from the spray gun it passes through a mixing chamber in the chilling apparatus and then out over impact spreading cone.

The polymer suspension stream is advantageously ejected from the spray gun at a pressure of 15–150 psi (1–10 atmosphere). A suspension of particles in the suspension medium is advantageously kept in a storage tank in which the particles are stirred up by feeding in nitrogen or other gas. When the stream is to be applied, the appropriate valve is opened to allow the gas to escape with particles suspended therein and carried to the electrostatically charging chamber of the spray gun prior to mixing with the chilling gas medium. Various other means may be used to feed polymer particles into the gas stream such as Venturi, screw feed, blower, pump, etc.

For particles of $4.7^{-10}$ gm or 5 microns in size and a voltage of about 80–100 kilovolts applied between the gun and the object it is estimated that the particles have an initial velocity of about 11 meters per second and about 0.09–0.10 meters per second in the vicinity of the workpiece. Smaller sized particles, e.g., of less than 1 micron are more favorable since the ultimate speed due to the electrical feed will be higher than for larger particles.

In applying the electrostatic charge it may be advantageous to have a series of electrodes spaced in pairs along the path of the suspended particles with a voltage of approximately 20 kilovolts applied between each pair of electrodes and applied transversely to the direction of flow of the gas.

SPECIFIC EMBODIMENT OF THE INVENTION

The description of the process and apparatus of this invention are facilitated by reference to the drawings.

FIG. 1 is an elevational front view of a preferred modification of the device and system for effecting cooling of the particles suspension.

FIG. 2 is a side cross-sectional view of the device of FIG. 1 taken at line 2—2.

FIG. 3 is a side elevational view of a spray gun adapted by the device of FIGS. 1 and 2 to effect cooling of a gas stream with suspended particles and to supply electrostatic charge to the particles.

FIG. 4 is a top view of the front portion of spray gun shown in FIG. 3.

FIG. 5 is a side cross-sectional view of the front portion of the spray gun shown in FIGS. 3 and 4 taken at line 5—5 of FIG. 4.

FIGS. 1 and 2 show the spray gun attachment 19 which is designed to effect cooling of a gas stream carrying finely divided particles which are already electrostatically charged or about to be electrostatically charged. The cooling nozzle 15 is preferably made of polytetrafluoroethylene (PTFE). Metal ring or band 16 slides over the exterior of a portion of the spray gun attachment 19 to hold gas entrance duct 20 in position. Cold gas such as nitrogen is fed into the spray gun from cooling tank 21 which preferably consists of a rigid, expanded polyurethane foam in which a heat exchange coil 22 is positioned in cooling chamber 23. The coil is advantageously made of copper tubing having a diameter of about 10 mm. Cover 24 closes the chamber to reduce the admission of heat. The coolant contained in the cooling chamber is advantageously either dry ice (solid carbon dioxide) or liquid nitrogen. When the gas inlet line 25 is opened, gaseous nitrogen, or other preferred gas, flows through cooling coil 22 and the cooled gas (preferably at −70°−−140° C.) flows through the hose connector 26 to gas entrance duct 20 attached to and communicating with the recessed portion 20' running around the circumference of the mixing chamber 15 and feeding cold gas through channels 27 into the interior of chamber 15 of cooling attachment 19.

FIGS. 3, 4 and 5 show the equipment of FIGS. 1 and 2 attached to electrostatic spray gun 18. High voltage preferably in the range of 70–120 kv is developed in generator 32 and transmitted through lines 33 into the interior of the spray gun through switch 34 to high voltage condenser cascade 35 and then through high voltage transformer 36 to electrodes 37. Meanwhile particles of the desired size and type are stored in reservoir 38 maintained in suspended state by gas admitted by line 39 at the bottom of the reservoir from which the gas stream conveys the suspended particles through hose 40 into the spray gun where they are electrostatically charged as they pass between electrodes 37 into mixing channel 15 where the particles are chilled to the desired low temperature by mixture with the cold gas being admitted through duct 20.

The mixing device of this invention is found to operate very efficiently in chilling the electrostatically charged particles emanating from an electrostatic spray gun. It is preferable to have the cooling equipment positioned after the spray gun. Otherwise the chilled gas suspension would have to pass through the electrostatic charging equipment thereby chilling the electrodes and other parts coming into contact with the chilled gas suspension and also effecting some rise in temperature in the chilled suspension. However where such effects are not critical or may be offset the chilling equipment may be positioned prior to the electrostatically charging apparatus. In such cases obvious appropriate changes would be made in the positioning and arrangement of the apparatus described herein. Nevertheless the cooling device will have the same essential elements described herein.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. A device capable of being handheld and capable of being held in a relatively horizontal position for the chilling of a gas stream containing particles suspended therein comprising a nozzle having (a) a passageway extending linearly therethrough, a first end of said passageway comprising the end through which said gas stream having particles therein is admitted to said passageway, the other end of said passageway comprising the end through which said stream exits from said passageway, (b) a cooling means for chilling gas, (c) a source of gas to be chilled, (d) a source of a gas stream containing particles, and (e) an inlet channel for admitting a chilled gas to the interior of said nozzle connecting and communicating with said passageway whereby the chilled gas admitted through said inlet channel intermingles with the gas suspension passing through said passageway and out.

2. The device of claim 1 in which said nozzle has an annular passageway encircling the said linear passageway but not connecting directly therewith, and a plurality of channels connecting said annular passageway with said linear passageway for the admission of gas from said annular passageway into said linear passageway.

3. The device of claim 2 in which the said first end of said linear passageway is connected to and communicates with the exit end of a spray gun adapted to discharge electrostatically charged particles.

4. The device of claim 1 in which the said first end of said linear passageway is connected to and communicates with the exit end of a spray gun adapted to discharge electrostatically charged particles.

5. A device capable of being handheld and capable of being held in a relatively horizontal position for the chilling of a gas stream containing particles suspended therein comprising a nozzle having (a) a passageway extending linearly therethrough, a first end of said passageway comprising the end through which said gas stream having particles therein is admitted to said passageway, the other end of said passageway comprising the end through which said stream exits from said passageway, (b) an inlet channel for admitting a chilled gas to the interior of said nozzle connecting and communicating with said passageway whereby the chilled gas admitted through said inlet channel intermingles with the gas suspension passing through said passageway and out, in which said nozzle has an annular passageway encircling the said linear passageway but not connecting directly therewith, and a plurality of channels connecting said annular passageway with said linear passageway for the admission of gas from said annular passageway into said linear passageway, in which said annular passageway communicates with and is connected to a feed line from a reservoir having a gas supply therein and having a cooling means therein whereby the gas contained therein is supercooled before admission into said feed line.

6. The device of claim 5 in which said reservoir has a cooling coil therein in which said gas may be contained and cooled by said cooling means, said coil communicating with and connected to said feed line.

7. The device of claim 6 in which the said first end of said linear passageway is connected to and communicates with the exit end of a spray gun adapted to discharge electrostatically charged particles.

8. The device of claim 5 in which the said first end of said linear passageway is connected to and communicates with the exit end of a spray gun adapted to discharge electrostatically charged particles.

9. A device capable of being handheld and capable of being held in a relatively horizontal position for the chilling of a gas stream containing particles suspended therein comprising a nozzle having (a) a passageway extending linearly therethrough, a first end of said passageway comprising the end through which said gas stream having particles therein is admitted to said passageway, the other end of said passageway comprising the end through which said stream exits from said passageway, (b) an inlet channel for admitting a chilled gas to the interior of said nozzle connecting and communicating with said passageway whereby the chilled gas admitted through said inlet channel intermingles with the gas suspension passing through said passageway and out, in which said inlet channel communicates with and is connected to a feed line from a reservoir, said reservoir having a gas supply and a cooling means therein whereby the gas contained therein is chilled before admission into said feed line.

10. The device of claim 9 in which said reservoir has a cooling coil therein in which said gas may be contained and cooled by said cooling means, said coil communicating with and connected to said feed line.

11. The device of claim 10 in which the said first end of said linear passageway is connected to and communicates with the exit end of a spray gun adapted to discharge electrostatically charged particles.

12. The device of claim 9 in which the said first end of said linear passageway is connected to and communicates with the exit end of a spray gun adapted to discharge electrostatically charged particles.

* * * * *